United States Patent Office 3,829,522
Patented Aug. 13, 1974

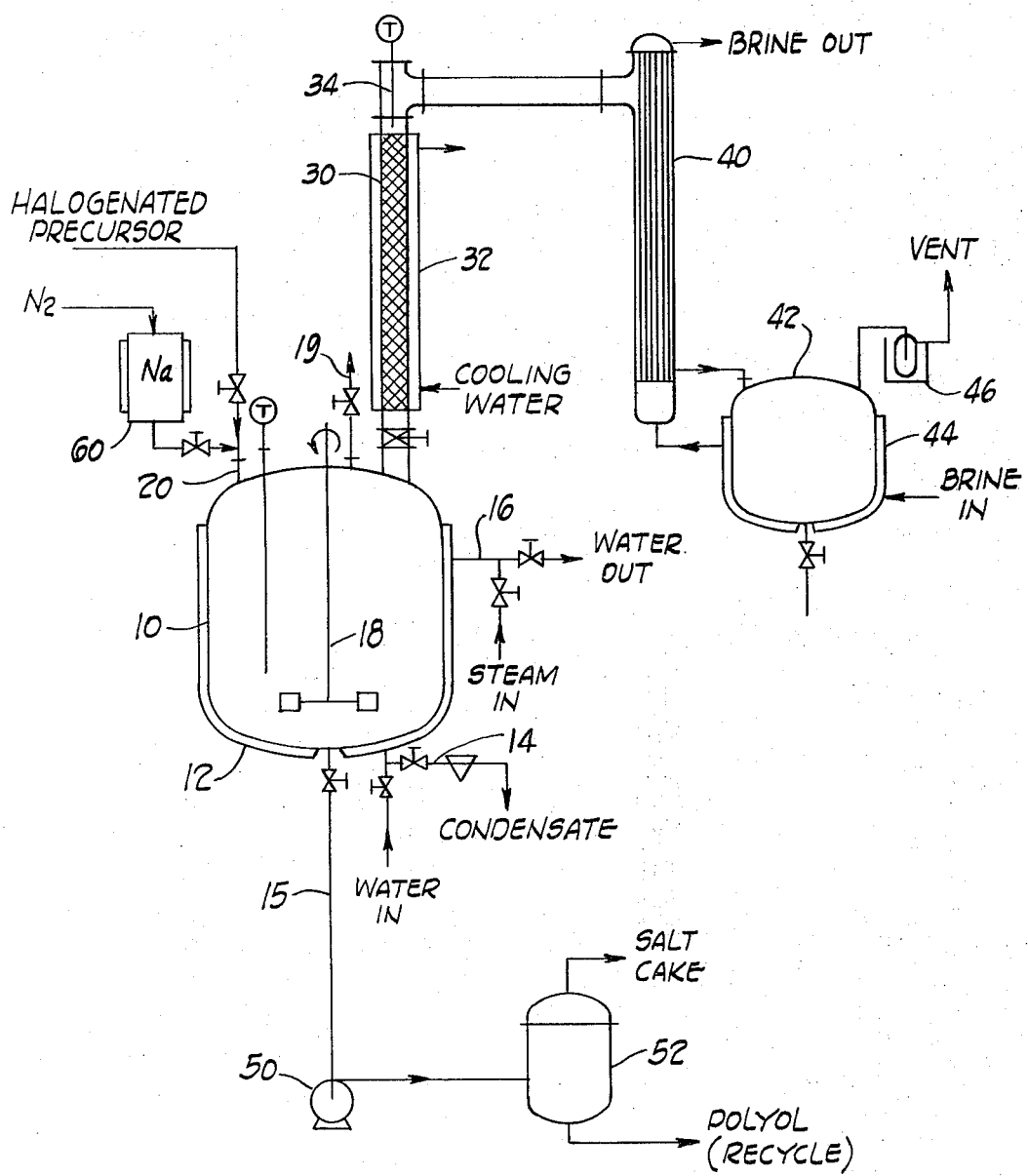

3,829,522
SYNTHESIS OF ALKYNES BY DEHYDRO-
HALOGENATION
Charles A. Schneider, Villa Hills, Ky., assignor to The
Sherwin-Williams Company, Cleveland, Ohio
Filed Oct. 21, 1971, Ser. No. 191,442
Int. Cl. C07c 11/22
U.S. Cl. 260—678                                    14 Claims

ABSTRACT OF THE DISCLOSURE

A process for preparing alkynes of high purity by dehydrohalogenation. Halogenated precursors consisting of dihaloalkanes and monohaloalkenes are reacted with a partial alcoholate of an alkali metal and an aliphatic polyol. The reaction mixture remains fluid during the process. Alkynes and volatile by-products are evaporated from the reaction mixture and partially condensed in a separation column to recover the high-purity alkyne product. The volatile by-products are returned to the reaction mixture as a condensed liquid. The alkyne products are obtained in high yield.

Background of the Invention

This invention relates to the preparation of alkynes by dehydrohalogenation. In particular, it relates to reaction of a halogenated alkyne precursor with alkali metal alcoholates.

Acetylene derivatives have been manufactured by conventional processes, such as reaction of sodium acetylide with alkyl halides or reaction of halogenated hydrocarbons with alkali metal hydroxides or alkoxides. In U.S. Pats. 2,846,491 and 2,848,520 Rutledge discloses methods for synthesizing substituted acetylenes by forming a dispersion of monosodium acetylide in an inert organic liquid diluent and reacting the acetylide with alkyl halides or sulfates, such as dimethyl sulfate, diethyl sulfate, n-butyl bromide or n-octadecyl bromide.

Processes are known for the preparation of 1-alkynes by the dehydrohalogenation of dihaloalkanes or of monohaloalkenes. Propyne has been prepared from 1,2-dibromopropane using potassium hydroxide or sodium ethoxide solutions in ethanol as dehydrohalogenation agents. 1,2-Dichloropropane may be reacted with potassium hydroxide in methanol at 175° C. and 5 atmg. to yield 70–80% propyne; but it is probable that the reaction under these conditions is hazardous, owing to the possibility of initiating a violent exothermic decomposition or polymerization of propyne.

Alkynes having at least 4 carbon atoms in the molecule may be prepared by the dehydrohalogenation of the corresponding dihaloalkanes or monohaloalkenes by heating them with a solution of an alkali metal alkoxide of an alcohol boiling above 100° C., in a water-free alcohol boiling above 100° C. In order to obtain good yields of alkynes, the alkoxide solution employed must be anhydrous. The anhydrous alkali metal alkoxide is obtained by dissolving the alkali metal itself in the alcohol.

It is known to react a halogenated precursor with an alkali metal alcoholate of a monohydric ether, such as potassium ethoxyethanolate, as described in U.S. Pat. 2,542,976. Such reactions may be conducted in a reaction mixture comprising a solvent having free hydroxyl groups, for example ethylene glycolmonoethyl ether, hexanol, propylene glycol, etc.

In U.S. Pat. 2,908,732 there is disclosed a dehydrohalogenation process for preparing 1-alkynes which comprises continuously feeding a 1,2-dihaloalkane or a 1- or 2-monohaloalkene into a stirred heated reaction mixture containing an alkali metal hydroxide or alkoxide in an alcohol boiling above 100° C. This process is conducted at a rate such that the temperature of the solution is not substantially lowered during the addition and in an amount such that the alcohol present at all times contains enough alkali metal hydroxide or alkoxide to be at least 50 wt. percent saturated. The alkyne is separated from the vapors released from the solution. Diluent alcohols for operating this process include ethoxyethanol, butoxyethanol, and ethoxyethoxyethanol, and ethoxyethoxyethoxyethanol, and butoxyethoxyethanol.

Prior art processes are deficient in the purity of the desired product which can be obtained. In particular, the alkynes having 4 or more carbon atoms in a chain are subject to migration and isomerization phenomena. It is not clearly understood how the shifting of acetylenic bonds from one position in the chain to another takes place during the dehydrohalogenation reaction with alkali metal alcoholates. It is believed that acetylenic bonds are isomerized to form substituted allenes, isomeric acetylenes or conjugated unsaturated compounds. For instance, in the synthesis of 1-butyne from 1,2-dihalobutanes, 2-butyne formed in the reaction as by-product is a close-boiling isomer of the desired product, and is extremely difficult to separate from the desired product by conventional unit processes. Higher-boiling volatile products released from the dehydrohalogenation reaction mixture are easily separated by distillation; but, those impurities having nearly the same molecular weight as the product are troublesome if not impossible to remove. In *Organic Chemistry* by Whitmore, Vol. 1, 2nd Ed., Dover Publications, New York, pp. 70–1, it is stated that in the conversion of 1,2-dibromobutane to the corresponding butyne, using alcoholic KOH, 2-bromo-1-butene, 1- and 2-ethoxy-1-butene, and 1,2-butadiene, impurities are produced along with the 1- and 2-butyne isomers in varying amounts.

It is an object of the present invention to prevent formation of the close-boiling by-products in the dehydrohalogenation reaction to produce alkynes of high purity.

BRIEF SUMMARY OF THE INVENTION

It has been discovered that dehydrohalogenation reactions between a halogenated precursor containing dihaloalkyl or monohaloalkenyl groups and an alkali metal alcoholate in a liquid reaction mixture can be improved by reacting the precursor with at least a stoichiometrically-equivalent amount of a partial alcoholate reaction product of an alkali metal and an aliphatic polyol having 2 to 8 carbon atoms. It is preferred that the polyol have at least 2 primary alcohol groups per molecule in its unreacted form, and that the partial alcoholate have an average of about 0.2 to 1 alkali metal groups per free hydroxyl group. Diols having a molecular weight of about 62 to 200 are suitable for preparing the partial alcoholates. In general, the reaction may be carried out at temperatures in the range between the normal boiling point of the alkyne product and the boiling point of the polyol, typically between 100° and 240° C.

The halogenated precursors for synthesizing alkynes according to this invention may be selected from the group consisting of

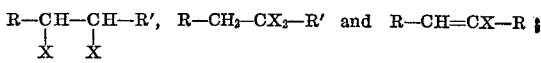

where X is halogen and where R and R' are each selected from H, aliphatic radicals having 1 to 20 carbon atoms, aryl radicals having 6 to 10 carbon atmos, aralkyl radicals having 7 to 12 carbon atoms, and where R and R' taken together form a carbon bridge of 3 to 14 carbon atoms.

The halogenated precursor is fed continuously to the reaction mixture, wherein the alkali metal alcoholate is maintained in excess until near the end of the process when all the halogenated precursor is added. As the reaction proceeds, volatile alkyne product and by-products are evaporated from the reaction mixture. In a separation column operatively connected to the closed reaction vessel, the volatile stream is partially condensed, the less-volatile by-products are returned to the reaction mixture, and the alkyne product is recovered.

The Drawing

The single figure of the drawing is a schematic representation of the process equipment used in the synthesis of alkynes by dehydrohalogenation.

Description of the Process and Equipment

The present invention can be comprehended from a detailed description of the preparation of the alkali metal polyalcoholate reaction mixture, the dehydrohalogenation reaction steps, product separation and recovery steps. In the following examples, all units are given in parts by weight, unless otherwise stated.

Referring to the drawing, there is shown a schematic diagram of the process equipment, including a jacketed reaction vessel 10, which is constructed of suitable inert material, for example stainless steel. In the ethyl acetylene process to be described, this vessel is closed with a dished top and bottom and has a volume capacity of about 300 U.S. gallons. It is equipped with a jacket 12 having a valve assembly 14 for admitting cooling water to the jacket or removing steam condensate. Another valve assembly 16 removes cooling water or admits steam to the jacket 12. The reaction vessel is equipped with a single turbine agitator 18 and a vent 19. Access to the reactor is through inlet valve 20.

Directly above vessel 12 is a separation column 30, provided with a cooling jacket 32. Separation unit 30 is a stainless steel cylindrical column of 6-inch diameter mounted vertically. The column is about 8 feet in length and is jacketed by carbon steel covering about 6 feet of the length. Jacket 32 is supplied with cooling water. The separation column 30 contains a packing support plate at the bottom and is packed with approximately 6 feet of 1-inch ceramic Berl saddles. Outlet temperature of the packed column can be monitored by a temperature sensor 34. The separation column 30 is so connected to the reaction vessel 10 to permit reflux condensate to return to the vessel by gravity flow.

Connected to the exit end of cylindrical riser 30 is a shell and tube condenser 40, having about 26 ft.$^2$ of heat exchange surface. Condenser 40 is supplied with cold brine on the tube side, and the bottom product outlet drains liquified product to a 30 gallon product receiver 42. This is a glass-lined vessel equipped with a cooling jacket 44, maintained below the normal boiling point of the liquid product by cold brine. The product receiver 42 is vented through a Dry Ice trap 46.

After completion of a batch reaction, the reaction vessel 10 is cooled to ambient temperature. The residue contains solid salt in a liquid slurry containing polyol. The residue is removed from the reaction vessel 10 through bottom line 15 by pump 50 and separated into a salt cake and polyol-containing liquid by a separation means, such as filter 52. The liquid may be recycled to the process without purification.

As a process option, the alkali metal partial alcoholate may be prepared in the same reaction vessel 10 used for the dehydrohalogenation step. Recycled polyol from filter 52 is charged back into the reactor, and a source of liquid sodium is connected to the reactor through inlet valve 20. Molten sodium is a hazardous material which must be protected from moisture. Solid sodium metal obtained as cast metal in drums 60 is melted and metered under a nitrogen purge into the reactor 10 wherein the temperature is maintained by the heat exchange jacket 12. Hydrogen evolved during the formation of the alcoholate is vented from the reactor through valve 19.

*Preparation of Partial Alcoholates*

The alkali metal alcoholates used in the practice of this invention may be prepared by reacting the free metal with an excess of polyol. Suitable polyols include those aliphatic compounds having 2 to 8 carbon atoms per molecule, preferably those polyols having a molecular weight of about 62 to 200. Dihydric alcohols are preferred; in particular, those polyols containing 2 primary alcohol groups. Suitable polyols include ethylene glycol ($HOCH_2CH_2OH$), diethylene glycol $$(HOCH_2CH_2OCH_2CH_2CH),$$

2,2 - dimethyl propane - 1,3 - diol (neopentyl glycol, $HOCH_2C(CH_3)_2CH_2OH$), triethylene glycol, tetraethylene glycol, 1,1,1-trimethylol ethane, propylene glycol ($CH_3$—$CHOH$—$CH_2OH$), 1,4-butanediol $$(HO(CH_2)_4OH),$$

1,3-butanediol ($CH_3CHOH$—$(CH)_2OH$), 2-butyne-1,4-diol, 1,4-cyclohexanediol, 1,4-cyclohexanedimethanol, 2,2-diethyl - 1,3 - propanediol, 2,3 - $p$-dioxanediol, 2-ethyl-1,3 - hexanediol, 1,6 - hexanediol, 2 - methyl - 2,4-pentanediol, 3 - methyl - 1,5 - pentanediol, 1,5-pentanediol, 1,3-propanediol, etc. The boiling point of the polyols should be substantially higher than that of the alkyne product, usually above 245° C.

The aliphatic polyols include diols of saturated and unsaturated non-aromatic hydrocarbons. These may be straight chain, branched chain, and cyclic compounds. The aliphatic compounds may be substituted with inert groups, such as ether linkages, which do not interfere with the formation of the alkali metal alcoholate or the dehydrohalogenation reaction. The polyols may be used in a reaction mixture consisting of the alcoholates of a single polyol or mixtures of partial polyalcoholates of alkali metals.

The alkali metal may be lithium, sodium or potassium. Sodium is preferred where the alcoholates are prepared by direct reaction of the free metal with fresh or recycled polyols.

Example 1: Preparation of sodio diethylene glycol

To a temperature controlled closed reaction vessel is charged 1,258 pounds of diethylene glycol $$(HOCH_2CH_2OCH_2CH_2OH)$$

and the reactor is purged with nitrogen gas. The charge is heated to about 120–130° C. Molten sodium (105 pounds) is added to the diethylene glycol slowly over about 16 hours, while maintaining the reaction mixture at about 140–150° C. Hydrogen is liberated by the reaction and is vented from the closed vessel. The product is 1,354 pounds of the partial alcoholate. The mol ratio of diethylene glycol to sodium was 2.6:1, giving a ratio of sodium to free hydroxyl groups in the partial alcoholate of about 0.24:1. This product may be used directly in the dehydrohalogenation reaction without further treatment.

Halogenated Precursors

The process of this invention is advantageous in the preparation of volatile alkynes boiling below about 240° C. The precursors may have one or two sets of halogen and hydrogen groups on adjacent carbon atoms for the formation of an acetylenic triple bond. For instance, 1-butyne (ethyl acetylene) can be prepared from 1,1 - dibromobutane, 1,2 - dibromobutane, 1 - bromo - 1-butene, 2-bromo-1-butene or other halogen analogs of these compounds.

A halogenated precursor may be selected from $$R-\underset{X}{C}H-\underset{X}{C}H-R', \quad R-CH_2-CX_2-R', \quad \text{or} \quad R-CH=CX-R',$$

where X is halogen and where R and R' are each selected from hydrogen, aliphatic radicals having 1 to 20 carbon atoms, aryl radicals having 6 to 10 carbon atoms, aralkyl radicals having 7 to 12 carbon atoms, and where R and R' taken together form a carbon bridge of 3 to 14 carbon atoms.

The di-halogenated straight chain alkane series having 2 to 22 total carbon atoms are one typical class of precursors, which includes 1,2-dibromoethane, 1,2-dibromopropane, 1,2-dibromobutane, 1,2-dibromopentane, 1,2-dibromohexane, 1,2-dibromooctane, 1,2-dibromodecane, 1,2-dibromododecane, 1,2-dibromooctadecane, etc. These produce the corresponding 1-alkynes upon dehydrobromination. Chlorine analogs of these may be used. Branched chain precursors may be used, as in 1,2-dibromo-3,3-dimethylbutane and 1,2-dibromo-6-ethylhexane. The corresponding 1,1-dihaloalkanes produce the same alkynes, as do the 1-halo-2-hydroalkenes and 2-halo-1-hydroalkenes. The term aliphatic radical as used above includes saturated and unsaturated hydrocarbons as well as those aliphatic radicals having substituent groups which do not interfere with the dehydrohalogenation reaction. For instance, R or R' may be aliphatic radicals substituted with ether groups or halogenated aromatic radicals, i.e., 2,3-dibromo-n-propyl ethyl ether or p-chlorophenyl-1,2-dibromoethane. R and R' should not be substituted with functional groups which are detrimental to the dehydrohalogenation reaction. For instance, sulfonic acid, carboxylic, hydroxyl or ketone groups should not be present in the precursor molecule.

Where R or R' is selected from aryl radicals having 6 to 10 carbon atoms, these may include phenyl, p-tolyl, phenyl rings substituted with one or more lower alkyl groups such as methyl, ethyl, propyl, or t-butyl. Halogenated aryl groups may be used.

Cyclic alkynes may be prepared from those precursor compounds selected where R and R' taken together form a bridge. For instance, cyclo-octyne is produced by dehydrohalogenation of 1,2-dihalooctanes.

The radicals R and R' may undergo combustion during the dehydrohalogenation reaction, depending on the reaction conditions and chemical nature of the precursors. Thermal stability of the precursor radicals is not necessary to the practice of this invention; however, the alkyne product should be thermally stable under the reaction conditions until evaporation has occurred. Ordinarily, the alkyne product has a normal boiling point below the reaction temperature and substantially below 240° C., and the precursors have a normal boiling point higher than that of the alkyne.

Where polyacetylenic products are desired, it may be possible to synthesize these from precursors containing two dehydrohalogenation sites. However, many diynes polymerize under reaction conditions. The reaction sites may be both dihaloalkane or may have either one or two monohaloalkene precursor sites.

Aralkyl radicals are also satisfactory as precursor moieties. These include those instances where R or R' is selected from aryl-substituted alkyl groups, such as phenylbutyl, benzyl, etc. 6-Phenyl-2-hexyne may be produced from 6-phenyl-2-bromo-2-hexene or other aralkyl halogenated precursors.

*The Dehydrohalogenation Reaction*

In the improved reaction one equivalent of alkali metal alcoholate moiety (NaO—polyol) is consumed per equivalent of hydrogen halide moiety removed. In the case of the 1,2-dihaloalkanes, two alcoholate moieties are consumed by the reaction:

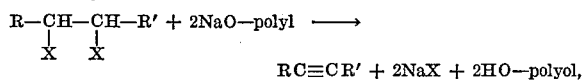

where polyol indicates the residue of the alcohol. In the corresponding synthesis from a monohaloalkane, the reaction is:

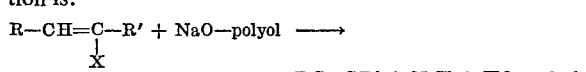

The reaction may be catalyzed by a small amount of iodine ($I_2$), usually about 0.5 to 1% by weight of the precursor. The iodine catalyst may be dissolved in about 5 parts diethylene glycol and charged to the reactor with the partial alcoholate in the reaction liquid. Yields based on halogenated precursor are ordinarily about 65% to 75% of theory. The alkyne product which can be made by this process is obtainable in essentially 100% purity. Anhydrous conditions are required for the process equipment and feed streams in order to obtain maximum purity in the product. The reactor and adjacent equipment are purged before the reaction with nitrogen gas.

The reaction is carried out above the boiling point of the alkyne product and below the boiling point of the polyol. For most processes, 100° to 240° C. is satisfactory, with 115° to 180° C. being a preferred temperature range, and 120° to 150° C. being optimum (for the $C_3$ to $C_{10}$ 1-alkynes). The reaction temperature may drop gradually as volatile by-products refluxed from the separation column 30 re-enter the reaction mixture. It is important that the separation column be carefully controlled to assure that no by-product is permitted to escape in with the alkyne product vapors. A careful check of temperature sensor 34 and control of the precursor feed rate will provide adequate protection for the separation process. Total reaction time depends upon the reactivity of the halogenated precursors and alcoholates, as well as reaction temperature, agitation rate, batch size, and process equipment capacities.

The stoichiometric amounts of alkali metal alcoholate present in the reaction mixture should be equal to or greater than the equivalent amount of halogenated precursor. Although a large excess of alcoholate is feasible, it is preferred that only slight excess be used.

The following example of dehydrobromination is given as a typical synthesis process according to the present invention.

Example 2: Preparation of Ethyl Acetylene

A 300-gallon reaction vessel is dried and purged with nitrogen. A charge of 1354 pounds sodio diethylene glycol reaction liquid, as prepared in Example 1, is added to the reactor and heated to 140 to 150° C., along with 2.9 pounds of iodine catalyst. 1,2-Dibromobutane (493 pounds) is fed slowly with stirring to the heated reaction mixture at a controlled rate. The reaction temperature is held at 140–150° C. initially. Cooling water at ambient temperature or slightly tempered by heating, is circulated through the separation column jacket to maintain the upper portion of the column at a temperature not exceeding 35–40° C. The product ethyl acetylene (1-butyne) distills overhead from the column as it is condensed and collected in a brine-cooled receiver at about 0° C. After all of the dibromobutane has been charged, the reaction mixture is stirred for one hour at gentle reflux (115–120° C.). The product yield is 80 pounds of ethyl acetylene (65% of theoretical yield), and the product purity is essentially 100%. All of the dibromobutane precursor is consumed in this reaction.

Example 3: Recycle of reaction liquid residue

The reaction residue from Example 2 is cooled to ambient temperature (20° C.). This residue consists essentially of sodium bromide salt slurry in a liquid containing diethylene glycol. The slurry is pumped from the reaction vessel to a filter to separate a salt cake from the reaction liquid residue. The polyol-containing liquid is recharged to the reaction vessel for recycle and reaction with molten sodium as in Example 1. No loss of product purity was noted for polyol recovered and recycled up to 5 times. This advantage of the invention can give considerable economic benefit to the overall process.

While the invention has been shown in specific examples, there is no intent to limit the inventive concept except as set forth in the following claims.

What is claimed is:
1. A dehydrohalogenation process for converting a halogenated precursor to an alkyne which comprises the steps of
   (a) heating a reaction liquid in a closed vessel to a reaction temperature in the range of about 100° C. to about 240° C., said reaction liquid consisting essentially of an alcoholate formed by the partial reaction of an alkali metal and an aliphatic polyol having 2 to 8 carbon atoms and a ratio of alkali metal to free hydroxyl groups of about 0.2:1 to 1:1;
   (b) feeding to the heated reaction liquid with stirring a halogenated precursor selected from

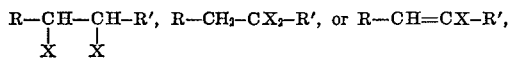

where X is halogen and where R and R' are each selected from hydrogen, aliphatic radicals having 1 to 20 carbon atoms, aryl radicals having 6 to 10 carbon atoms, aralkyl radicals having 7 to 12 carbon atoms, and where R and R' taken together form a carbon bridge of 3 to 14 carbon atoms;
   (c) maintaining anhydrous conditions and a stoichiometric excess of alcoholate reaction liquid over the halogenated precursor during the dehydrohalogenation reaction to produce an alkyne product and by-product;
   (d) evaporating the alkyne product from the volatile by-product by partial condensation in a separation column above the closed vessel;
   (f) recovering the alkyne product from the separation column; and
   (g) returning condensed volatile by-product from the separation column by gravity to the reaction mixture.
2. The process of claim 1 wherein the aliphatic polyol consists of ethylene glycol or diethylene glycol, the halogenated precursor is a 1,2-dihaloalkane having 3 to 10 carbon atoms, and the reaction temperature is about 115° C. to 180° C.
3. The process of claim 2 wherein a sodium alcoholate of diethylene glycol prepared by the partial reaction of from 2.6 mols of diethylene glycol per mol of sodium is reacted with 1,2-dibromobutane at a temperature of about 120° C. to about 150° C. to produce ethyl acetylene in high purity.
4. The process of claim 3 wherein the reaction mixture contains iodine catalyst.
5. The process of claim 1 wherein the dehydrobromination process is operated batchwise by feeding continuously the halogenated precursor to a total stoichiometric equivalent of alkali metal alcoholate in the reaction liquid.
6. The process of claim 5 wherein alkali metal halide salt and polyol by-products are removed from the reaction vessel, separated and the polyol is reacted with alkali metal to form the reaction liquid for a subsequent batch.
7. In the process of preparing alkynes by dehydrohalogenation where a halogenated precursor containing dihaloalkyl or monohaloalkenyl groups is reacted with an alkali metal alcoholate in a liquid reaction mixture, the improvement which comprises reacting the precursor with at least a stoichiometrically-equivalent amount, based on alkali metal content, of an alcoholate reaction product of an alkali metal and an aliphatic polyol having 2 to 8 carbon atoms, said polyol having at least 2 primary alcohol groups per molecule in its unreacted form, and said alcoholate having an average of 0.2 to 1 alkali metal groups per free hydroxyl group.

8. The process of claim 7 wherein the polyol is a dihydric compound having a molecular weight of about 62 to 200 and wherein the reaction is carried out at a temperature of about 100° to 240° C.
9. The process of claim 7 wherein the precursor is a 1,2-dibromoalkane having 3 to 20 carbon atoms, the polyol is diethylene glycol, and the alkali metal is sodium.
10. The process of claim 9 wherein the alcoholate is the partial reaction product of 2.6 mols of polyol per mol of sodium, wherein the reaction mixture contains catalytic amount of about 0.5 to 1 wt. percent iodine, and wherein the reaction temperature is about 120° to 150° C.
11. The process of claim 7 wherein the alkyne product is a thermally stable compound under reaction conditions and has a normal boiling point below reaction temperature.
12. The process of claim 11 wherein the dehydrohalogenation process produces essentially no volatile by-products having a normal boiling point close to that of the alkyne product.
13. The process of claim 7 wherein the precursor consists essentially of 1,2-dibromobutane, wherein the polyol consists essentially of diethylene glycol and the process is carried out at a temperature in the range of about 115° to 150° C.
14. A process of making alkynes by dehydrohalogenation which comprises the steps of:
   (a) reacting molten sodium with a stoichiometric excess of a liquid consisting essentially of polyol having at least two primary alcohol groups per polyol molecule and having an average polyol molecular weight of about 62 to 200 to produce a partially reacted alcoholate liquid mixture having not more than one alkali metal group per free hydroxyl group;
   (b) heating the liquid mixture of step (a) under anhydrous conditions at about 100° to 240° C. with a halogenated precursor containing at least one dihaloalkane or monohaloalkene group to produce a thermally-stable volatile alkyne, salt and polyol-containing residue, and volatile by-products, said volatile by-products having a normal boiling point substantially higher than the alkyne;
   (c) evaporating the volatile alkyne and volatile by-products from the reaction mixture of step (b);
   (d) separating the alkyne and volatile by-products by distillation;
   (e) returning condensed by-product from step (d) to step (b);
   (f) recovering alkyne product by condensation;
   (g) recovering the salt and polyol-containing residue from step (b);
   (h) separating the salt from the polyol in the residue; and
   (i) recycling at least a portion of the polyol from step (h) to step (b).

References Cited
UNITED STATES PATENTS

| 2,542,976 | 2/1951 | Airs et al. | 260—678 |
| 2,846,491 | 8/1958 | Rutledge | 260—678 |
| 2,848,520 | 8/1958 | Rutledge | 260—678 |

DELBERT E. GANTZ, Primary Examiner

J. M. NELSON, Assistant Examiner

U.S. Cl. X.R.
260—679